March 21, 1933. J. A. YUNKER 1,901,885
PROCESS FOR THE MANUFACTURE OF INDUSTRIAL HYDROGEN
Filed July 8, 1930
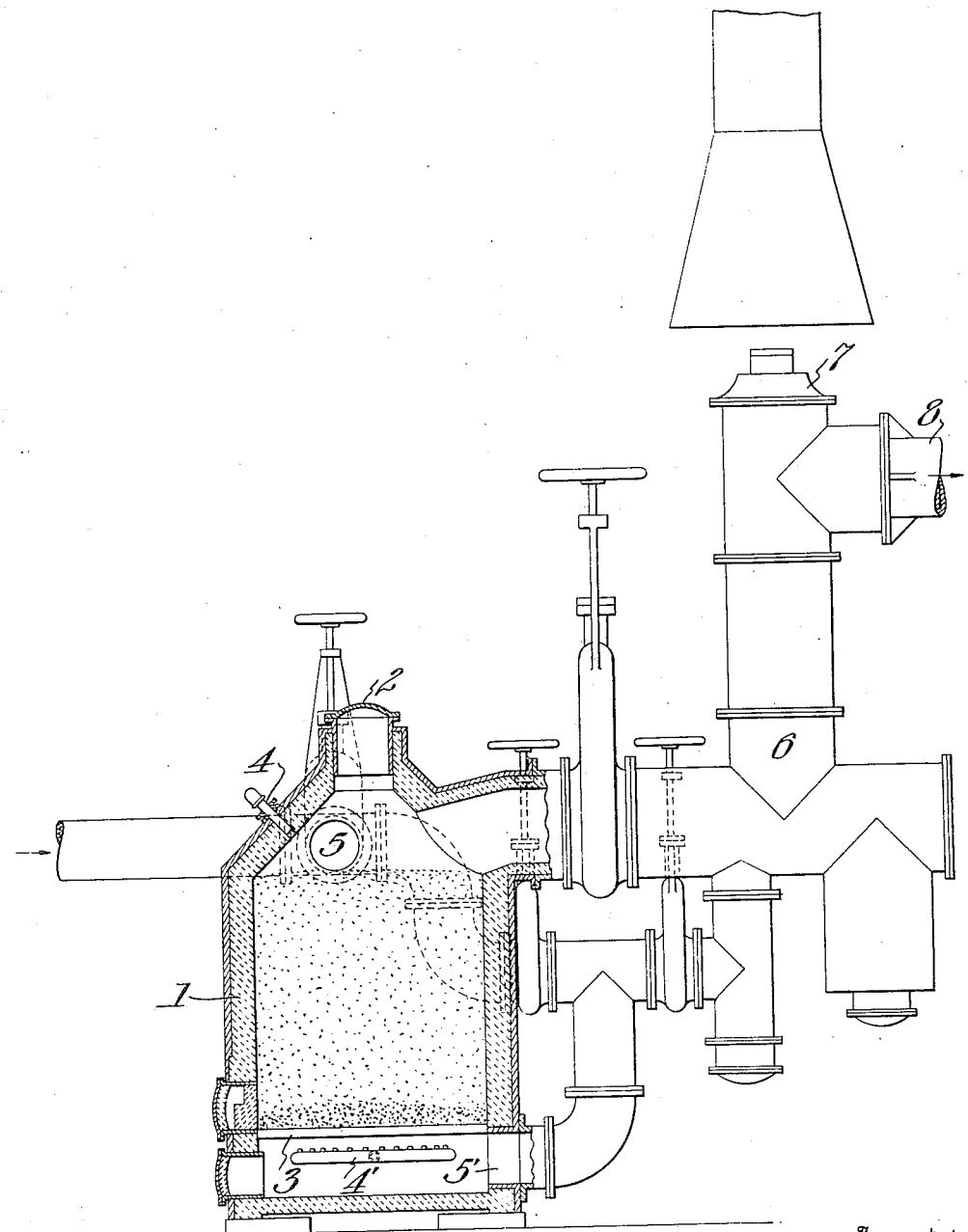
Inventor:
James A. Yunker,
By Byrnes, Townsend & Potter,
Attorneys.

UNITED STATES PATENT OFFICE

JAMES A. YUNKER, OF LOUISVILLE, KENTUCKY, ASSIGNOR TO NATURAL GAS HYDROGEN CORPORATION, OF NEW YORK, N. Y., A CORPORATION OF DELAWARE

PROCESS FOR THE MANUFACTURE OF INDUSTRIAL HYDROGEN

Application filed July 8, 1930. Serial No. 466,560.

This invention relates to a process for the production of hydrogen suitable for use in industrial processes, such as ammonia synthesis, production of gasoline from fuel oils, hydrogenation of oils and fats, methanol synthesis, etc. from hydrocarbons such as natural gas, refinery gases and the like.

It is well known that ammonia can be synthesized from a hydrogen-nitrogen mixture, and it is also well known that a large proportion of the cost of synthesized ammonia lies in the cost of the hydrogen used. One object of the present invention is therefore to produce hydrogen suitable for the synthesis of ammonia at a relatively low cost and therefore to correspondingly lower the cost of the ammonia. My prior application Serial No. 212,774, filed Aug. 13, 1927, relates to the production of hydrogen-nitrogen mixtures suitable for ammonia synthesis.

The invention resides in a process involving thermal decomposition of hydrocarbons, which produces directly and by an economical continuous operation a gas which so far as I am aware contains a higher content of hydrogen and a lower content of methane and other undesirable impurities than any hitherto known process involving hydrocarbon decomposition and capable of being used commercially. In addition the process yields commercial carbon black, the value of which in part offsets the cost of processing.

From another point of view, the invention provides a new use for natural gas which increases the market for this gas and permits of its utilization for the production of products which have a greater economic value than is realized by many forms of its utilization. In other words, the value of the natural gas resources of the country are materially increased by the present invention.

The first cost of the necessary apparatus is relatively low, operating costs are small and very little purification of the gas is necessary before it can be used in most commercial apyplications for hydrogen.

The process consists generally in contacting a hydrocarbon in gaseous state with incandescent coke and preferably is carried out in a manner somewhat similar to that of the well-known so-called blue water gas process.

The accompanying drawing is a vertical section with parts in elevation illustrating one form of apparatus, i. e., a standard water-gas generator, suitable for carrying out the process.

Referring to the drawing, 1 is the firebrick lined, substantially cylindrical generator provided with the usual fuel charging door 2, grate bars 3, steam inlets 4 and 4', air inlets 5 and 5' (coming into gas outlet at back), hot gas conduit 6, waste gas outlet 7, and valuable gas conduit 8, with the necessary valves for making up or downruns as desired. In the operation of the water-gas set illustrated in accordance with the invention the steam inlets 4 and 4' are used also as gas inlets.

The process is carried out as follows:

After a fuel bed of burning coke preferably of substantially uniform size has been built up in the generator 1 to the maximum height in the well known manner the bed is blasted with air, introduced through 5 or 5', until the temperature within the bed is in excess of 1200° C., a temperature of about 1400° C. being preferred, the blast gases being passed through 7 to waste or for utilization of the heat content and recovery of entrained carbon dust. The air blast is then shut off and after a short steam purge, natural gas is introduced through 4 or 4' into the incandescent fuel bed where it is decomposed with the formation of hydrogen and oxids of carbon, principally the monoxid, and carbon dust. The issuing gases contain as high as 95% hydrogen and as low as 0.5% methane, and after being freed from carbon dust, and purified are suitable for a variety of commercial uses. Considerable quantities of carbon black of high quality are produced and may be separated from the issuing gases and collected.

The operation of the generator is subject to variation by so many conditions, such as atmospheric temperature and humidity, character and size of coke, thickness of fuel bed, operating cycle, diameter of generator, thermal efficiency of the generator, composition of hydrocarbon-containing gas, rate of hydrocarbon gas run, water vapor content of gas, etc., that it is impossible to give a fixed formula for operation which will be most economical in all cases. By variation of these factors however, the quality and quantity of carbon black produced, the hydrogen and hydrocarbon content of the gas produced and the space velocity of the process may be controlled.

The operation of the generator is generally improved by occasionally or intermittently blasting the fuel bed with steam. The steam blasting tends to prevent clogging of the fuel bed by deposited carbon, its action apparently being to react with and remove the deposited carbon in a water gas reaction and to act upon the coke of the fuel bed in such a way as to prevent the formation of blow holes and break up dead spots.

In general the object sought for in the air blasting operation is to provide sufficient heat in the fuel bed to permit of the decomposition of the gas at economic space velocities. It is, of course, well known that in a gas treating process a part of the cost of the operation consists of the fixed charges and maintenance costs of the apparatus used. Where the treatment is necessarily at a low space velocity the fixed charges and maintenance costs on the equipment make the cost of the gas product so high that the process cannot be used economically. In accordance with the present invention space velocities are attained which result in such low fixed and maintenance cost per unit of gas made that the hydrogen can be produced at a substantially lower cost than by any known process of which I am aware.

The high space velocities are attained in accordance with my invention by comprehensive utilization of the facilities of the apparatus for maintaining the desired conditions in the fuel bed, i. e., by manipulation of the up and down-runs of air, gas and steam, etc., and by the use of coke or other similar form of carbon preferably of uniform size and free of fines as a catalyst for hastening the decomposition of the hydrocarbons and also as a means for providing the necessary heat.

For the purpose of illustration the following conditions of typical runs are given:

Using a generator of 7 feet inside diameter containing a fuel bed about 9 feet deep, natural gas was decomposed at the rate of 30,000 cubic feet per hour. This gave about 65,000 cubic feet of hydrogen gas of approximately 92% purity and at this space velocity the fixed charges and maintenance costs on the equipment used were less than four cents per 1000 cubic feet of gas produced. In this operation, starting with a fuel bed at about 1200° C., air at atmospheric temperature was blown into the generator at the rate of 5,000 cubic feet per minute for 3 minutes and the products of combustion were run to waste. The temperature of the fuel bed at the end of this blasting period was about 1400° C. The air supply was then shut off and after a half minute steam purge, natural gas of about the following composition:

| | Per cent |
|---|---|
| Methane | 78 |
| Ethane and higher hydrocarbons | 20 |
| Nitrogen | 1 |
| Carbon dioxid | 1 | was introduced into the generator at the rate of 750 cubic feet per minute for about 7 minutes, the products being run into storage. The cycle described requires a little more than 10 minutes (due to the time required for the manipulation of valves) and is repeated continuously with variations as required due to the condition of the fuel bed from clinker formation, incipient blow holes, etc., and with the necessary interruptions for charging new fuel and removal of clinker. Fuel was added in batches of about 1200 pounds every 4 hours and clinker was removed once each 24 hours. In the operation described above a down-run on gas was made every third run. Blasting with steam, say for a period of two to three minutes every fourth cycle in place of a gas run, may be employed to condition the fuel bed. It will, of course, be understood that the above described detailed operation is only an example and is subject to variation depending upon the operating conditions referred to above.

In a modification of the foregoing typical procedure two generators were operated in series, gas passing through the fuel beds in both generators, either up through both or down through both, or up through the first and down through the second or vice versa, depending upon the condition of the fuel beds, it being understood that manipulations of the direction of the gas flow through the fuel beds are made for the purpose of maintaining uniformity of temperature in the fuel beds. The use of two generators in series has the advantage over the use of a single generator in that the hydrocarbon content of the gas is thus practically completely cracked leaving only a trace, calculated as methane, as compared with 1.75% of methane, which represents the average, when one generator is used and the process is carried out at economic space velocities.

The consumption of fuel (coke) per 1000 cubic feet of hydrogen produced is about 6 pounds.

As appears from the foregoing, the preferred range of temperature in the operation is from 1200° C., the lowest temperature at which methane can be substantially completely cracked at economic space velocity, to 1400° C., the maximum temperature found to be suitable for smooth operation with the present day available designs of apparatus and the rates and periods of gas and air supplies are regulated accordingly. It is apparent, however, that a higher maximum temperature, say 1500° C., or a smaller range, for example 1250° C. to 1350° C., might be used without departure from my invention.

The steam purge referred to in the foregoing description of the process is quite important. In addition to conditioning the fuel bed to a certain extent supplementing the conditioning brought about by the steam runs referred to, it serves to drive out of the generator any air remaining as a result of the air blasting and thus to avoid explosions upon the introduction of the hydrocarbon gas. In the production of pure hydrogen it is also important that the beginning at least of the hydrocarbon gas run shall be in a direction through the generator opposite to that of the steam purge. Thus any water left in the generator from the steam purge is swept out of the generator and easily separable as such, from the hydrogen gas, whereas if the gas run were in the same direction as the steam purge, water would be carried through the fuel bed with the hydrogen gas yielding carbon monoxide which would mix with the hydrogen gas and be difficult to remove and highly objectionable in some uses of the hydrogen gas.

The invention is not limited to the treatment of gases consisting essentially of hydrocarbons such as natural gas, but may be applied also to gases containing relatively small amounts of hydrocarbons for cracking or eliminating these hydrocarbons. For instance, the process may be applied to a gas such as blue water gas made from soft coal to reduce the content of undesirable hydrocarbons so that such gas can be used as a source of hydrogen for certain industrial and chemical purposes.

I claim:

1. Process for the production of hydrogen which comprises blasting an ignited bed of coke with an oxygen containing gas to a temperature of at least about 1200° C., purging the bed of coke with steam and passing a hydrocarbon containing gas through the bed of coke in the direction opposite to that of the steam.

2. Process for the production of hydrogen which comprises blasting an ignited bed of coke with an oxygen containing gas to a temperature of at least about 1200° C., purging the bed of coke with steam, passing a hydrocarbon containing gas through said bed of coke and continuously repeating this cycle while maintaining the bed of coke in operative condition by supplying fresh coke thereto, removing ash therefrom, varying the time and direction of the oxygen-containing gas blasting, steam purging, and hydrocarbon containing gas run, and occasionally substituting for the gas run, a run with steam.

3. Process for the production of hydrogen which comprises blasting a bed of ignited coke with air to a temperature in the neighborhood of 1400° C., purging the bed with steam, passing natural gas through the bed of coke in the direction through the bed of coke opposite to that of the steam, and continuously repeating this cycle, occasionally substituting for the natural gas run, a run with steam to condition the fuel bed.

4. Process for the production of hydrogen which comprises blasting a bed of ignited coke with air to a temperature of from 1200° to 1400° C., purging the blasted coke with steam, passing natural gas through the coke while its temperature remains at least about 1200° C., continuously repeating this cycle occasionally substituting for the natural gas run, a steam run and alternating the direction of flow of the air, steam and natural gas through the bed of coke and splitting the runs thereof to maintain the coke bed in optimum condition with respect to space velocity and hydrocarbon cracking efficiency.

5. Process for the direct production of carbon black and a gas mixture containing as high as 95% of hydrogen and substantially less than 1.75% of methane which comprises the series of steps (1) blasting an ignited bed of coke with air to a temperature above about 1200° C., (2) purging the bed with steam, and (3) passing a hydrocarbon in gaseous form through the bed until its temperature falls to about 1200° C., continuously repeating said series of steps with an occasional substitution of steam for hydrocarbon in step (3), separating and collecting carbon black from the resulting gases and separately collecting the gases resulting from step (3).

In testimony whereof, I affix my signature.

JAMES A. YUNKER.